United States Patent [19]

Gaudin

[11] Patent Number: 4,881,678

[45] Date of Patent: Nov. 21, 1989

[54] PROCESS FOR THE REMOTE-CONTROLLED SEMI-AUTOMATIC WELDING OF TWO ROTATIONALLY SYMMETRICAL COMPONENTS

[75] Inventor: Jean P. Gaudin, Chassieu, France

[73] Assignee: Framatome, Courbevoie, France

[21] Appl. No.: 145,991

[22] Filed: Jan. 20, 1988

[30] Foreign Application Priority Data

Jan. 20, 1987 [FR] France .................. 87 00590

[51] Int. Cl.$^4$ ............................. B23K 9/02; B23K 9/10
[52] U.S. Cl. ............................. 228/102; 228/105; 228/119; 228/226; 228/8; 219/61.5; 219/76.12; 29/402.13; 29/402.16
[58] Field of Search .................. 29/402.13, 402.16; 228/225, 226, 102, 103, 105, 119; 219/76.1, 76.12, 61.5

[56] References Cited

U.S. PATENT DOCUMENTS

| | | | |
|---|---|---|---|
| 2,943,387 | 7/1960 | Dawson | 228/226 |
| 4,179,059 | 12/1979 | Change et al. | 228/103 |
| 4,216,893 | 8/1980 | Glatthorn | 228/119 |
| 4,234,119 | 11/1980 | Masaoka et al. | 228/226 |
| 4,526,311 | 7/1985 | Schröder | 29/402.13 |
| 4,624,402 | 11/1986 | Pitcairn et al. | 228/226 |
| 4,694,549 | 9/1987 | Rabe | 29/402.13 |
| 4,721,947 | 1/1988 | Brown | 228/103 |

FOREIGN PATENT DOCUMENTS

| | | | |
|---|---|---|---|
| 2532744 | 2/1976 | Fed. Rep. of Germany | 228/226 |
| 2412380 | 7/1979 | France | |
| 71579 | 6/1981 | Japan | 219/76.12 |
| 82980 | 4/1986 | Japan | |
| 2173316 | 10/1986 | United Kingdom | |

Primary Examiner—Nicholas P. Godici
Assistant Examiner—Samuel M. Heinrich
Attorney, Agent, or Firm—Pollock, Vande Sande & Priddy

[57] ABSTRACT

Welding is controlled from a control station (14) located at some distance from the welding zone. Before the start of a welding pass, the welding parameters are set by an operator, to whom the values to be given to the parameters as a function of the type of pass are supplied by a memory in which the information relating to the welding is stored. The welding operation is started, after the parameters have been checked as a function of the content of the memory. The welding operation is monitored continuously by the operator by means of a remote screen display of the welding zone. If appropriate, the operator changes some of the welding parameters according to the screen image of the welding zone. These changes are checked by comparison with the content of the memory.

5 Claims, 12 Drawing Sheets

PROCESS FOR THE REMOTE-CONTROLLED SEMI-AUTOMATIC WELDING OF TWO ROTATIONALLY SYMMETRICAL COMPONENTS

FIELD OF THE INVENTION

The invention relates to a process for the remote-controlled semi-automatic welding of two large-size rotationally symmetrical components.

BACKGROUND OF THE INVENTION

Where nuclear reactors, more particularly pressurized-water nuclear reactors, are concerned, it may be necessary to join large-size components, such as pipes of the primary circuit, by welding. In particular, such operations of joining together by welding may have to be carried out after a certain reactor operating time, during which the pipes of the primary circuit have acquired a relatively high radioactivity.

There has, for example, been a recent proposal to increase the service life of a nuclear power station by replacing with new steam generators the worn steam generators of a pressurized-water nuclear reactor, the tube bundle of which has become defective during long-term use.

To carry out this operation to replace a steam generator as a whole, it is necessary, in particular, for the primary-water inlet and outlet connections for the steam generator to be joined by welding to the corresponding pipes of the primary circuit which are held on standby in the reactor building.

In order to remove the worn steam generator, it is necessary to cut some parts of the primary pipes in the vicinity of the connections leaving the water box. After cutting, the ends of the pipes are remachined, and the connections of the new generator intended to replace the worn generator are designed to fit the pipes of the primary circuit which have been severed and remachined. The connections and pipes which have a large thickness, which may be of the order of 0.10 meters, and a larger diameter, which can rise to a value near a meter, then have to be joined together by welding. The machining of the cut end of the pipe and of the connection makes it possible to form between them a chamfer of specific shape open towards the outside an d limited towards the inside by two corresponding squeeze parts which are fixed in place by manual welding at the start of the joining operation.

The chamfer is then filled with build-up metal is successive passes by means of orbital TIG welding.

In the construction of a nuclear power station, the steam generators can be connected to the primary circuit on site without serious difficulties, the operator supervising and controlling the orbital welding device at the very locations where the welding operation is carried out, i.e., in the casemate of the steam generator, thus having direct control of the welding operation. The quality of the welding joint, which is subjected to an extremely stringent control (zero defect), therefore requires highly qualified operators whose concentration must be maintained during the entire execution of the welding pass.

To fill the chamfer completely, there must be a large number of welding beads, each laid all round the chamfer during an orbital welding pass. In order to join a generator connection and a pipe of the primary circuit, at present 185 welding beads must be deposited during the same number of orbital welding passes.

When a steam generator of a reactor which has already been in operation is changed, the primary connections are highly irradiated, and it is no longer possible to monitor and control the orbital welding operation from a point near the primary pipe.

There are known automatic orbital TIG welding processes which could theoretically make it possible to join the connection and the pipe of the primary circuit together by welding, without an operator being present in the casemate of the steam generator. However, in such automatic welding processes, a large number of parameters for the welding operation have to be preset in order to ensure that successive passes are executed satisfactorily. But during an operation lasting a very long time, some parameters, such as the position of the electrode in relation to the bath and in relation to the chamfer, still have to be monitored and adjusted continuously according to an examination of the welding zone. Theoretically, this continuous check could be carried out automatically, but the control of the process would then be too complex and would make it necessary to use extremely sophisticated and extremely expensive equipment.

There has therefore been a proposal for an operator to carry out televisual monitoring of the welding zone, this operator making the desired corrections of a certain number of parameters remotely by means of a remote-control unit.

Such a semi-automatic welding process cannot be used satisfactorily to join the connections of a steam generator to the corresponding pipes of the primary circuit of the reactor, because, where the quality of the weld is concerned, it is largely based on a continuous adjustment of parameters carried out by an operator from a television picture of the welding zone.

In fact, it is still possible for the operation to be carried out so that the welded joint does not have any defect, as long as the operator is actually present in the welding zone and can have direct access to the means of adjusting certain welding parameters. In contrast, when monitoring is carried out via a television image, analyzing the zone during welding and making a decision as to the parameters to be adjusted demand considerable effort and special training of the operator.

Moreover, if a joining chamfer of a steamgenerator connection is filled with build-up metal, the welding parameters relating to each of the passes will be different from the parameters of the pass executed immediately beforehand or from the parameters of the pass executed immediately thereafter. The adjustment intervals for the parameters controlled by the operator are also essentially variable from one pass to another. It therefore becomes very difficult, if not impossible, to make the desired adjustments at the start of a welding pass and control the adjustable parameters satisfactorily during the welding pass.

Although a certain methodology for welding large-size components, especially pipelines, by depositing metal in a chamfer, has been developed, the amount of information necessary to carry out the welding operation successfully in nevertheless too great to be used effectively by an operator monitoring the execution of the welding operation continuously.

When pipelines, such as a steam-generator connection and the corresponding pipe of the primary circuit of a reactor, are joined together, the build-up metal is deposited in successive layers, each of the layers consisting of welding beads, each formed during a pass all round the annular chamfer and placed next to one another. Each pass, depending on the position of the corresponding bead in the chamfer, can be linked to a predefined type which makes it possible to determine the welding parameters. These parameters therefore depend particularly on the type of pass and layer to which the bead being deposited belongs. It is clear that the mass of information necessary for carrying out the welding operation successfully is very great in an operation requiring no less than 185 welding beads.

SUMMARY OF THE INVENTION

The object of the invention is, therefore, to provide a process for the remote-controlled semi-automatic welding of two large-size rotationally symmetrical components by filling an annular chamfer with a welding metal in successive shielded-arc orbital welding passes, making it possible to form layers of welding metal in the chamfer by placing metal beads next to one another, each bead deposited during a pass being of a specific type, depending on its position in the chamfer, this process being intended to enable an operator to monitor and control remotely the progress of the welding operation while at the same time easily allowing for the specific nature of each of the successive passes made.

To achieve this object, from a control station located at some distance from the welding zone and managed by an operator, for each of the passes:

the welding parameters are set, the type of pass and the values to be given to the parameters as a function of the type of pass being supplied to the operator by a memory, in which the information relating to the welding is stored, the welding operation is started manually and remotely, after a check has been made that each of the welding parameters is set at a suitable value according to the type of pass, the welding operation is monitored continuously by means of a remote screen display of the welding zone, if appropriate, some welding parameters are changed according to the image of the welding zone, the limits within which the parameters can be changed being supplied to the operator by the memory, and the welding operation is stopped manually when the image obtained on the screen corresponds to the end of a pass.

BRIEF DESCRIPTION OF THE DRAWINGS

To make it easy to understand the invention, an exemplary embodiment of the process according to the invention, with regard to the welding of a steam-generator connection to a pipe of the primary circuit of a pressurized-water nuclear reactor, will now be described by way of example, with reference to the accompanying drawings, in which:

Figures 18, 19:
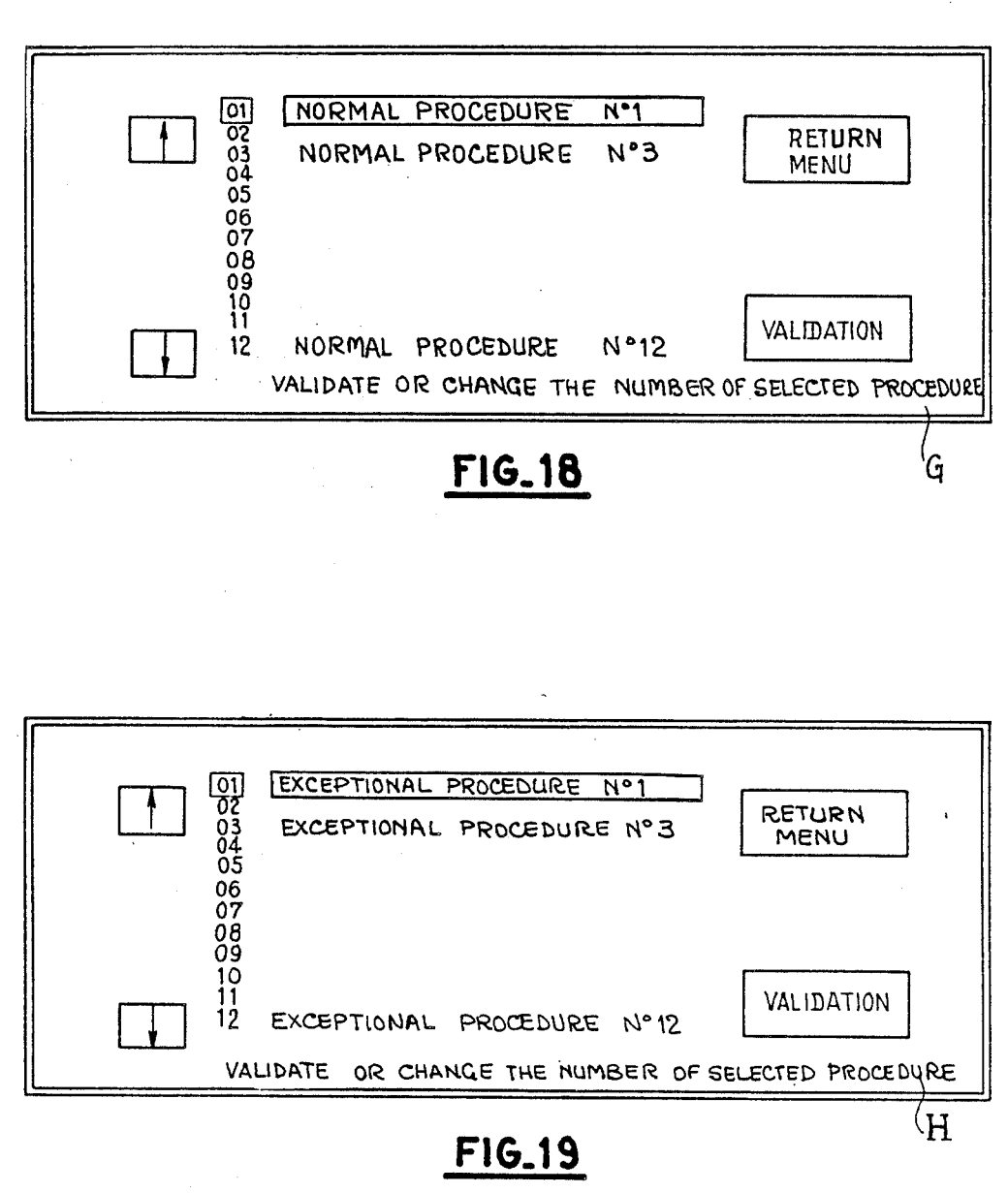

FIGS. 12 to 20 show the touch-screen of the computer for assisting the operator during nine different phases of the preparation for welding and of the welding operation itself.

DESCRIPTION OF PREFERRED EMBODIMENT

Figure 1:
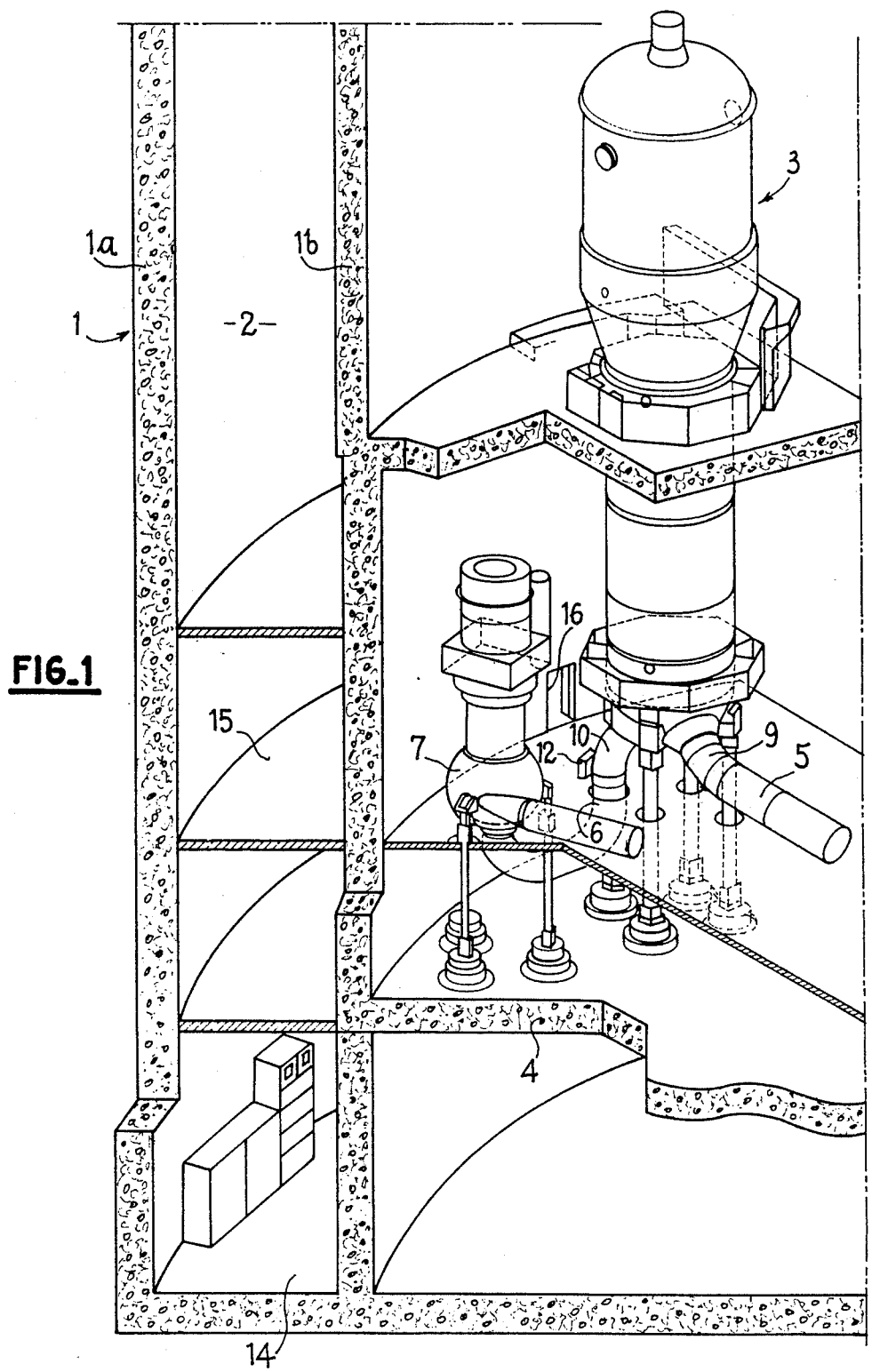
FIG. 1 is an exploded perspective view of the reactor building, showing the steam generator and the part of the primary circuit where welding is carried out.

FIG. 1 shows the building 1 of a pressurized-water nuclear reactor, comprising two coaxial containments 1a, 1b, between which an annular space 2 is formed. A steam generator 3 of the nuclear reactor is placed on the inside of the second containment 1b of the building and rests on an intermediate floor 4 by means of supporting columns. The steam generator is connected to the pipes 5 and 6 of the primary circuit, in which the pressurized water of the reactor circulates towards or from the vessel containing the core. Circulation is ensured by means of a primary pump 7.

The reactor as a whole comprises several loops, each having a heat exchanger, a primary pump and pressurized-water circulation pipes.

In FIG. 1, the steam generator 3 illustrated is a new generator intended to replace a worn generator which has relatively been dismantled and removed from the reactor building. During these dismantling operations, the pipes 5 and 6 of the primary circuit have been cut in order to separate them from the outlet connections of the water box of the worn steam generator.

After the replacement generator 3 has been installed, the connections 9 and 10 have to be welded to the respective primary pipes 5 and 6.

The operation which will be described relates to the welding of the connection 10 and the primary pipe 6 in a substantially vertical part, i.e., with a substantially horizontal welding joint.

It is clear that the welding operation, although not described, is likewise carried out for joining together the connection 9 and the pipe 5 by means of a substantially vertical welding joint.

The welding operation is controlled remotely, since the pipe 6 which has remained in contact with the primary fluid during the entire operating period of the nuclear reactor has a relatively high radio activity, even after a prior decontamination operation carried out over a restricted length of the order of 1 m.

To carry out this remote-welding operation, an orbital TIG welding device 12 fastened to the pipes 10, 6 to be joined is used. The orbital welding welding device 12 is controlled remotely from a control station 14 located at a lower level of the reactor building in the annular space 2. The operator in charge of the control station 14 has monitoring and remote-control means available for controlling the device 12. He also has a telephone link with a station 15 located at floor level in the casemate of the steam generator where welding is carried out. In this station, one or more operating aids are available, to go to work, as required, in the casemate of the steam generator which is accessible via a lock chamfer 16. The operating aid can be put work on the welding device for exceptional operations, such as changing the build-up wire reel or the electrode of the welding device.

Figure 2:
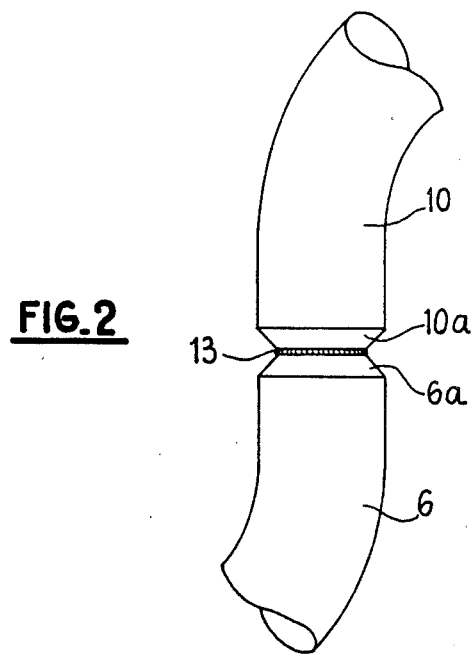
FIG. 2 is a perspective view of the connection of the steam generator and of the pipe of the primary circuit before the welding operation.

FIG. 2 shows the connection 10 of the steam generator in its position allowing it to be connected to the primary pipe 6. The primary pipe 6, after being cut, has been machined to form a chamfer 6a.

The connection 10 of the steam generator has a chamfer 10a at its end. The groove, in which the welding metal will be deposited, in delimited by the chamfers 6a and 10a of the connections 6 and 10, which are made to coincide with one another, at the moment when the steam generator 3 is installed in the reactor building. The relative position of the connection 10 of the pipe 6 is fixed by means of a welding joint 13 made manually.

Figure 3:
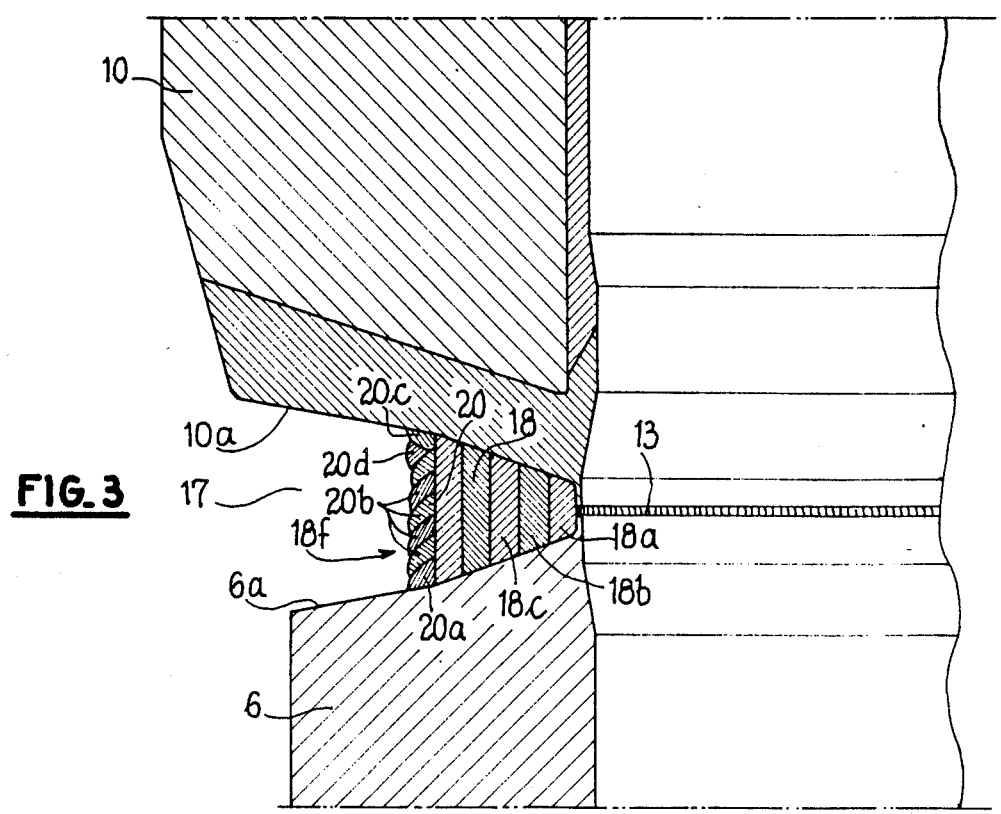
FIG. 3 is a half-view in longitudinal section through the chamfer during the welding operation.
Figure 4:
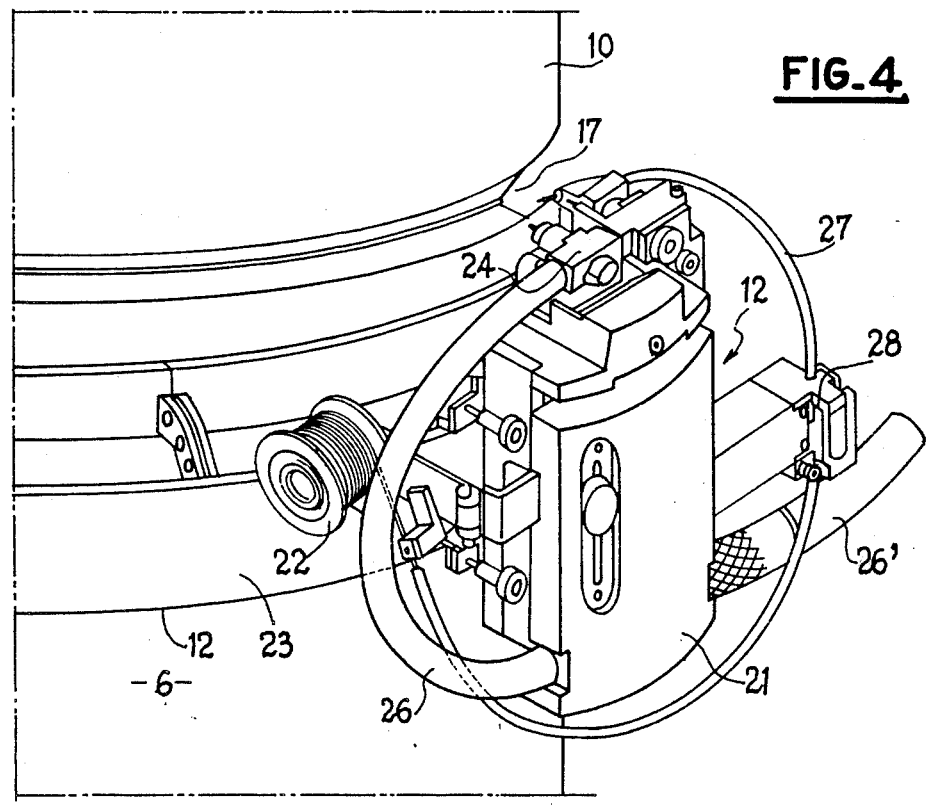
FIG. 4 is a perspective view of the welding machine used.
Figure 6:
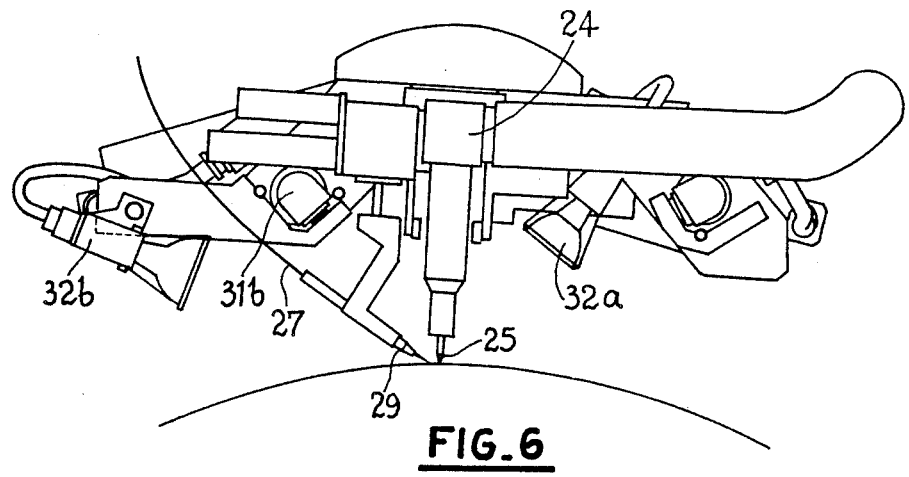
FIG. 6 is a plan view of the welding machine illustrated in FIG. 4, showing the welding torch and the visual means of monitoring the welding zone.
Figure 5:
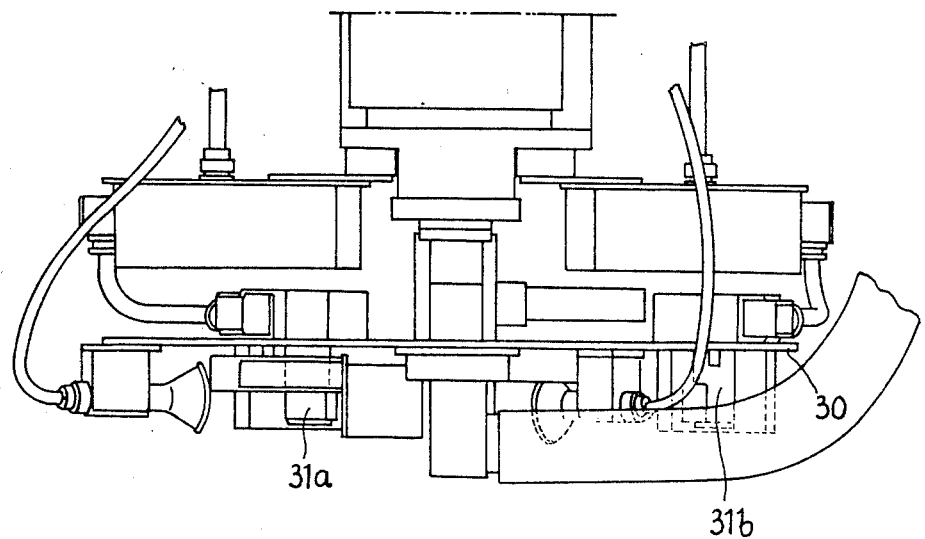
FIG. 5 is a front view of part of the welding machine illustrated in FIG. 4.

The welding machine making it possible to fill the groove 17 delimited by the chamfers 6a and 10a with build-up metal has been shown in FIGS. 4, 5 and 6. This welding machine of the orbital type, with a tungsten electrode, which deposits metal under an inert gas, is of an entirely conventional type and makes it possible to deposit successive layers of build-up metal 18 in the chamfer 17 (as can be seen in FIG. 3). The successive layers of build-up metal 18a, 18b, 18c, etc. are each formed by placing next to one another annular welding beads 20, each deposited during a welding pass in which the welding device 12 executes a complete revolution round the pipes 6 and 10.

The last layer deposited 18f, shown in FIG. 3, is formed by placing welding beads 20 of four different types 20a, 20b, 20c and 20d next to one another.

Where a horizontal welding joint joining to virtually vertical pipes sections is concerned, the welding bead 20a is deposited during the first welding pass for the corresponding layer 18f, this pass in the lower part of the chamfer 17 being called a base pass. The welding beads 20b are deposited during subsequent welding passes, called filling passes, for the chamfer 17. The bead 20c is deposited in the upper part of the chamfer 17 during a welding pass called a ceiling pass. Finally, the welding bead 20d is deposited last during a pass called a consolidating pass, intended to fill the free space remaining between the last bead 20b and the ceiling bead 20c.

The welding parameters relating to a particular pass depend on the position in which welding is carried out (horizontal, vertical or inclined welding joint), on the position of the layer in the chamfer (the complete filling of the chamfer is carried out by means of forty successive layers) and on the type of pass determined according to the process described above. The total number of welding passes is of the order of 180. This therefore means that the adjustment of the welding machine is highly complex.

The welding machine 12, as illustrated in FIGS. 4 to 6, is of a conventional type and comprises a motorized body 21 mounted movably on a circular rail 23 fastened to the pipe 6 slightly below the chamfer 17. The body 21 carries a welding head 24 ending on the same side as the chamfer in a tungsten electrode 25 and supplied with electrical current by means of cables passing through a sheath 26. The welding arc struck between the electrode 25 and the inner surface of the chamfer 17 makes it possible to fuse a build-up wire of suitable grade, which is brought into the welding zone by the agency of a guide tube 27 and movement means 28. The reserve of build-up wire consists of a reel 22 fastened to the body 21. The general supply of the welding machine with electrical current and protective inert gas is carried out by means of a flexible sheath 26'.

In order to render it usable in the process according to the invention, the conventional welding machine has been equipped with a stage 30, on which are mounted the welding head 24 and, on either side of this, two video cameras 31a and 31b making it possible to display the welding zone from two positions located respectively at the front and at the rear of the welding zone, as seen in the direction of orbital movement of the welding machine 12. The images provided by the cameras 31a and 31b are transmitted to the control station 14, where the operator monitors and controls the welding operation. Lighting means 32a and 32b are attached to the cameras 31a and 31b respectively, in order to illuminate the welding zone in which the build-up wire 29 is fused by the electrode 25 (FIG. 6).

Figure 7:
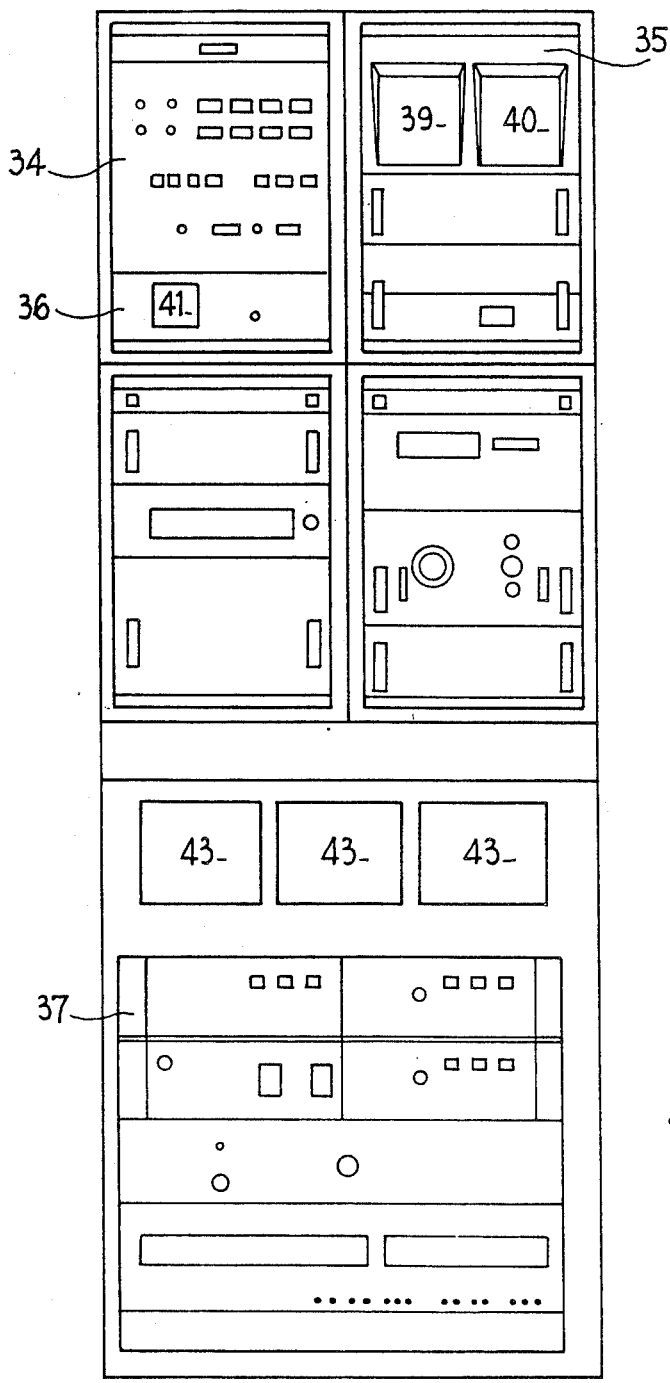
FIG. 7 is a front view of part of the control station managed by the operator.

FIG. 7 shows the main components of the control station which are used by the operator to monitor and control the welding operation. These elements consist of a cabinet 34 for the programming and remote control of the welding parameters, a video-tracking and telephone link assembly 35, an operator assistance computer 36 associated with memories containing all the data relating to the welding, and a video monitoring bay 37 enabling the operator to have a complete view of the zone of the casemate of the steam generator, in which welding is carried out.

Also located in the control station 14 is the current generator of the welding device (not shown), associated with boxes which contain the components supplying the generator and which are equipped with various signal lamps and cut-out switches.

The cabinet 34 for programming and controlling the welding operation makes it possible to display the parameters relating to a welding pass and transmit corresponding orders to the welding machine by remote control. The programming cabinet enables the operator both to set the parameters predetermined at the start of a welding pass and change the adjustable parameters during welding.

The display screens 39 and 40 of the video assembly 35 supply the operator continuously with images of the welding zone coming from the cameras 31a and 31b.

The operator assistance computer 36 has a touch-screen 41 enabling the operator to obtain any information necessary for determining the welding parameters at the start of a pass and for adjusting certain parameters according to the appearance of the welding zone displayed on the screens 39 and 40.

Finally, the screens 43 of the display unit 37 allow the operator to have a complete view of the welding site, for example in order to direct and supervise exceptional procedures carried out by the operating aids in the casemate of the steam generator.

Of the welding parameters, a distinction may be made between the preset parameters and the parameters variable during a welding pass. The preset parameters may be applicable to the whole of a welded joint or to a particular welding pass only.

Figure 8:
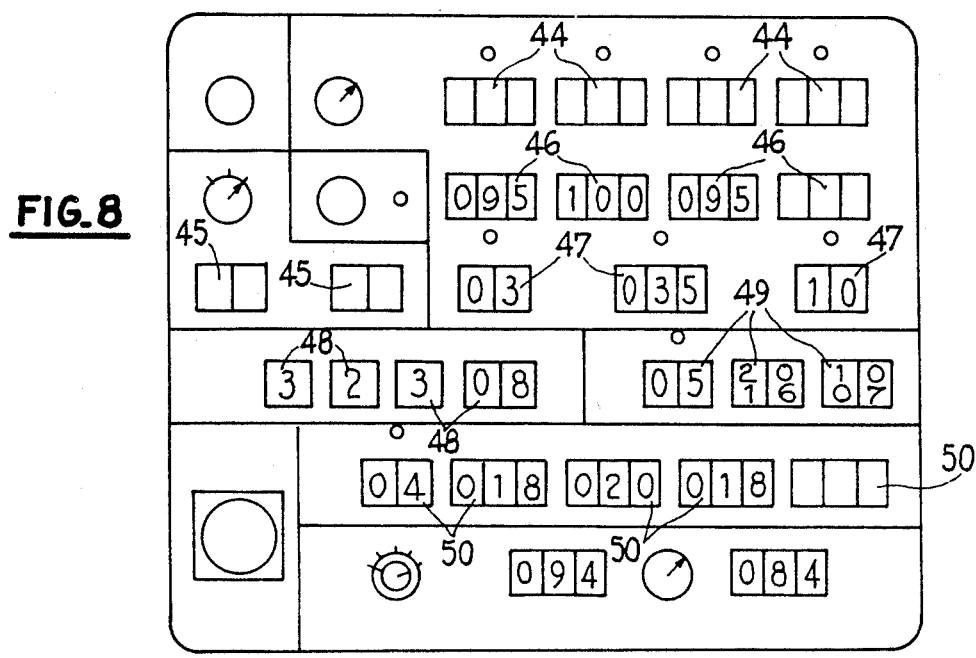
FIG. 8 is a front view of the cabinet for programming the welding parameters, located in the control station.

The parameters are entered in the programming cabinet 34 and transmitted to the welding head 12 in the form of commands; the values of these parameters are supplied and checked by the operator assistance computer 36. The parameters relating to a welding pass are displayed in numerical form on the front face of the cabinet 34. FIG. 8 shows an example of a display during a welding pass.

The indicator 44 relating to the welding sequence and the indicators 45 relating to the definition of the current pulses correspond to the parameters preset for the welded joint as a whole.

The other indicators relate to the parameters of the welding pass to be executed or in progress. The indicators 46 make it possible to fix and display the intensity for each of the welding sequences.

The indicators 47 define the exact characteristics of the current pulses.

The dials 48 give the characteristics of the scanning of the welding head.

The dials 49 refer to the parameters relating to the build-up wire.

The dials 50 relate to the movement of the welding machine.

Other dials or controls relate to the position of the electrode in relation to the chamfer.

During welding, the operator can also adjust certain parameters by remote action from an observation of the video images on the screens 39 and 40. The adjustable parameters relate to the position of the electrode in relation to the bath, this defining the length of the arc, to the position of the build-up wire in the welding and to the fine adjustment of the other geometrical parameters preset at the start of the pass.

In all cases, the choice of the parameters or their adjustment is supplied to the operator by the computer 36 which also carries out a check of the operator's actions in the way described below.

Figure 9:
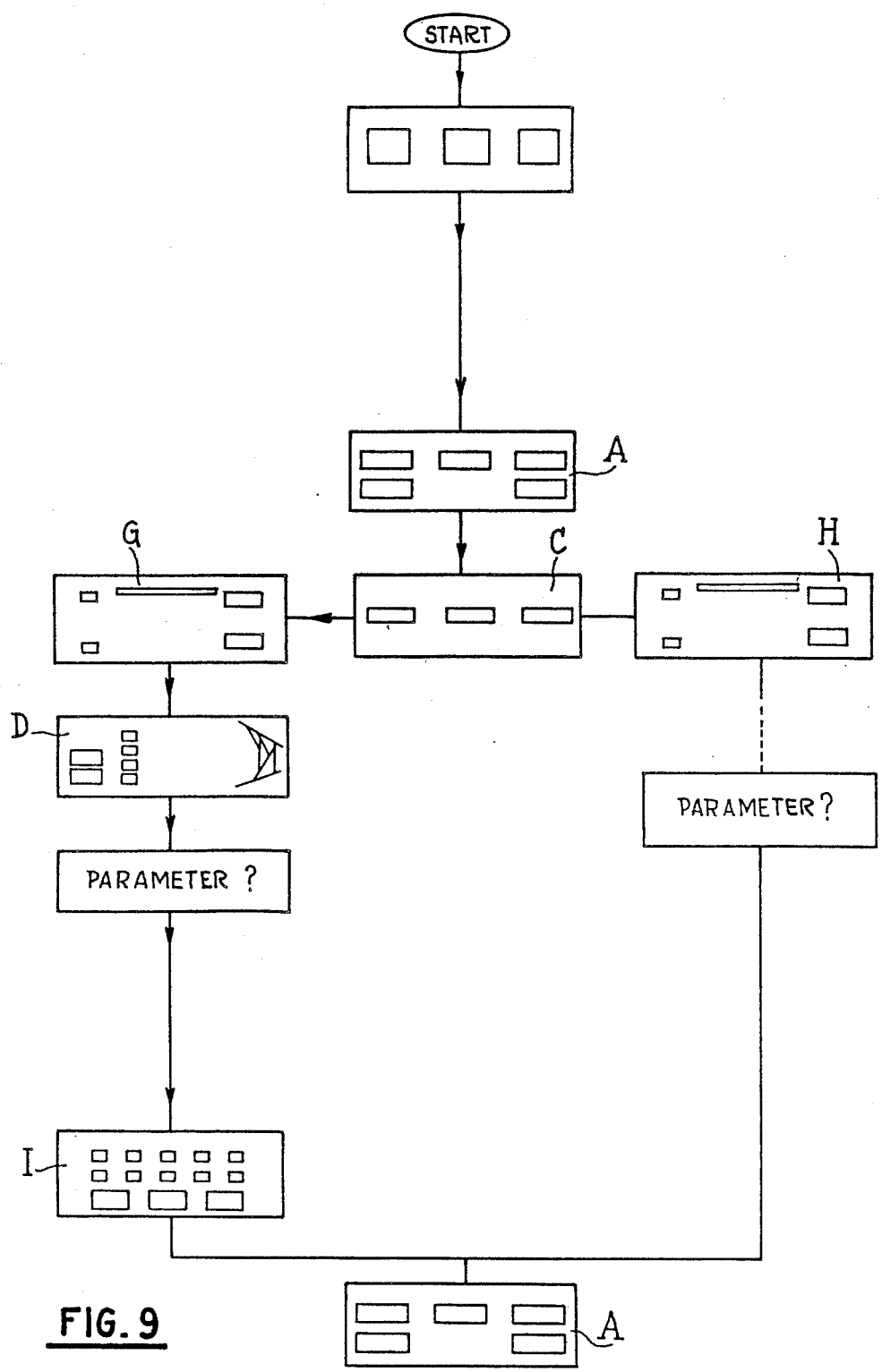
FIGS. 9, 10 and 11 are functional diagrams showing the execution of the computer-assisted phases for determining and checking the welding parameters.
Figure 10:
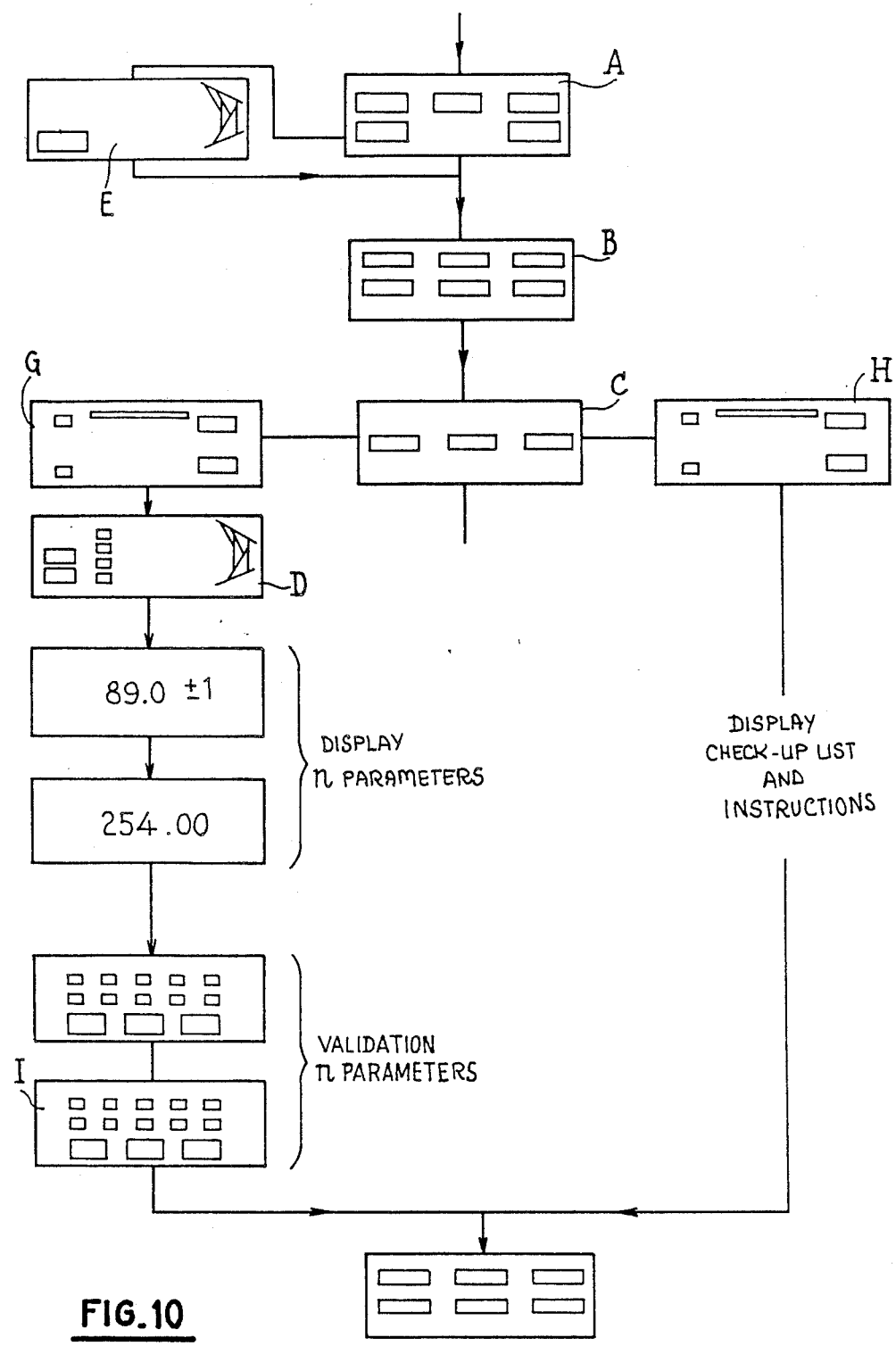
Figure 11:
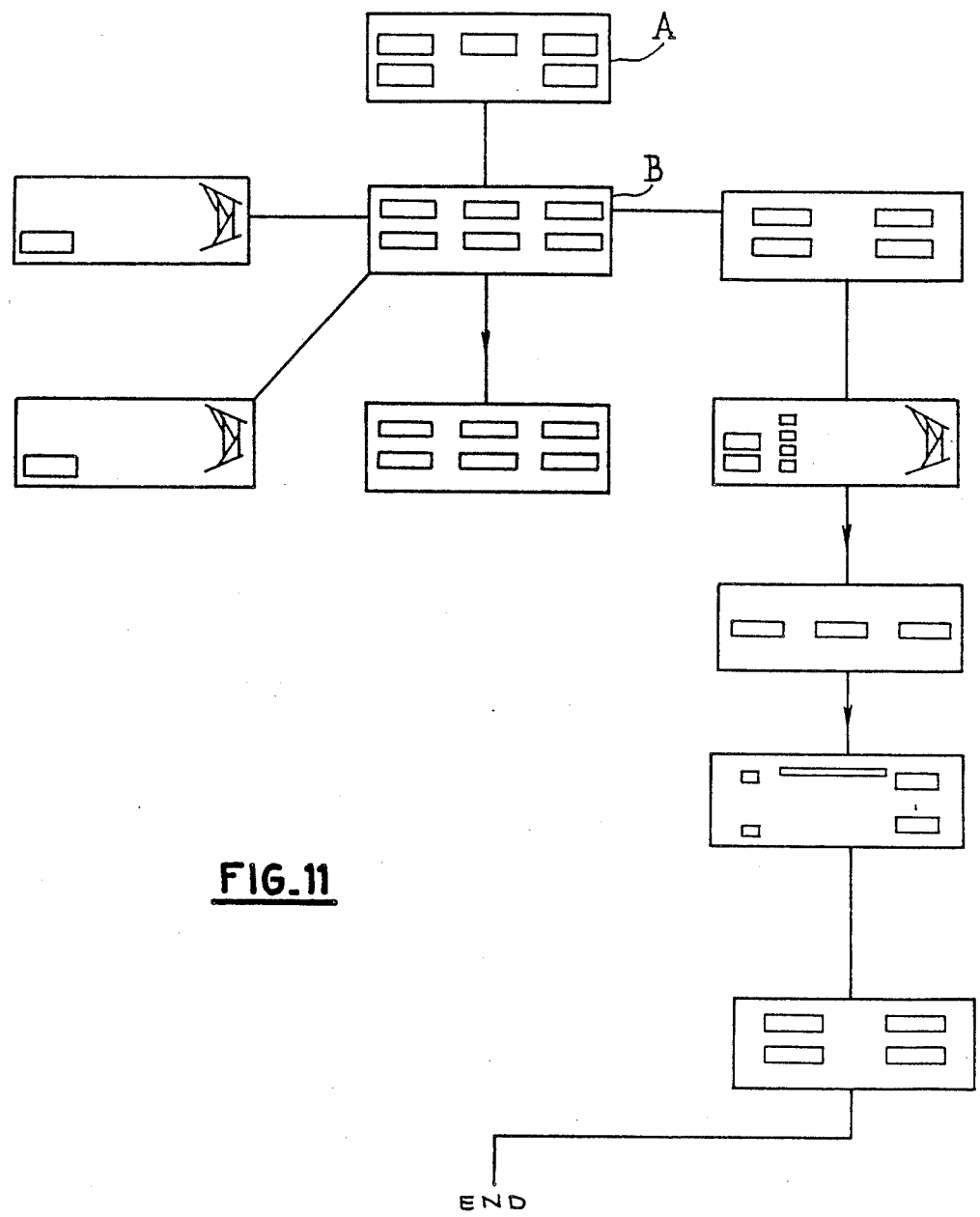
Figure 12:
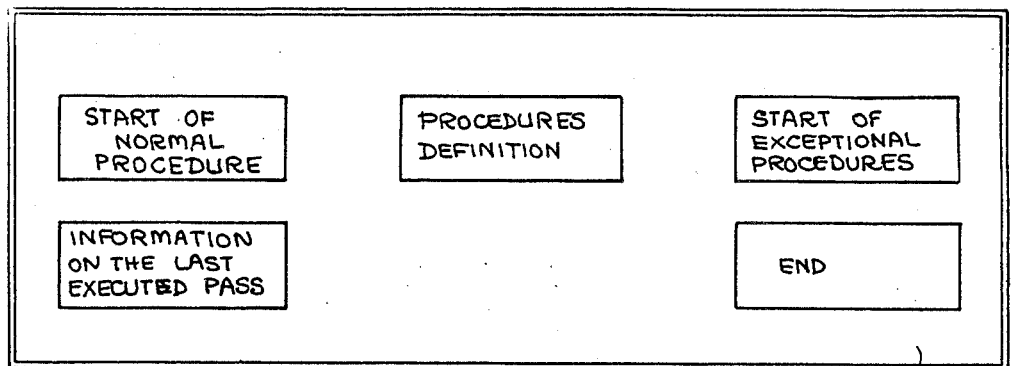
Figure 13:
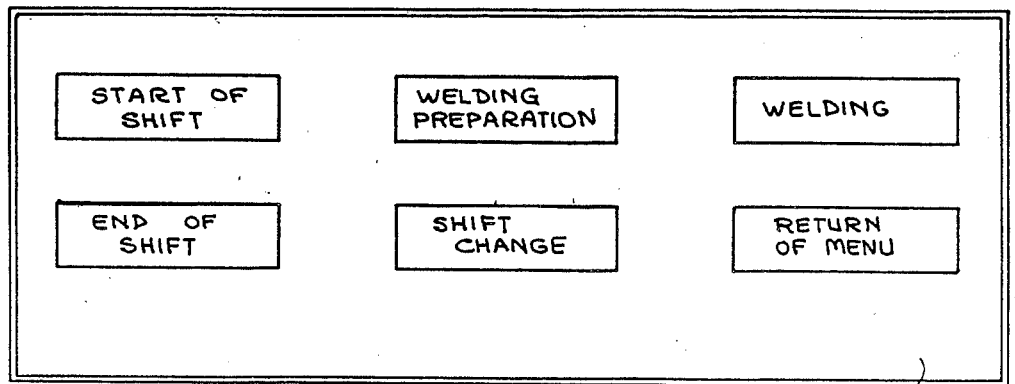
Figure 14:
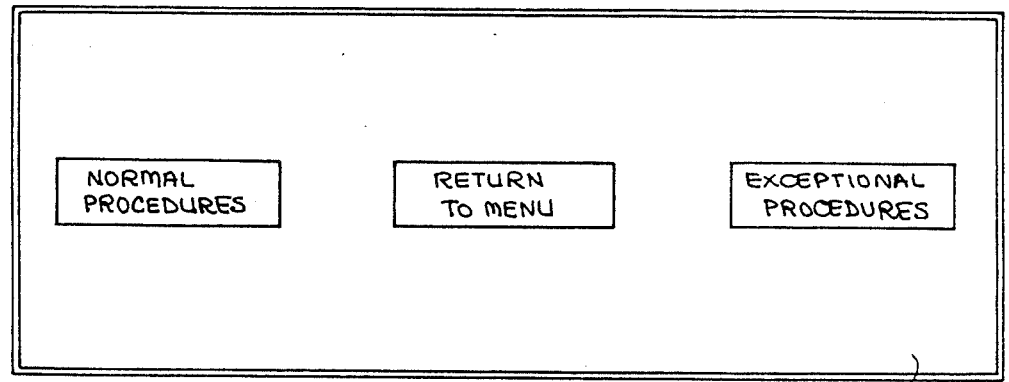
Figure 15:
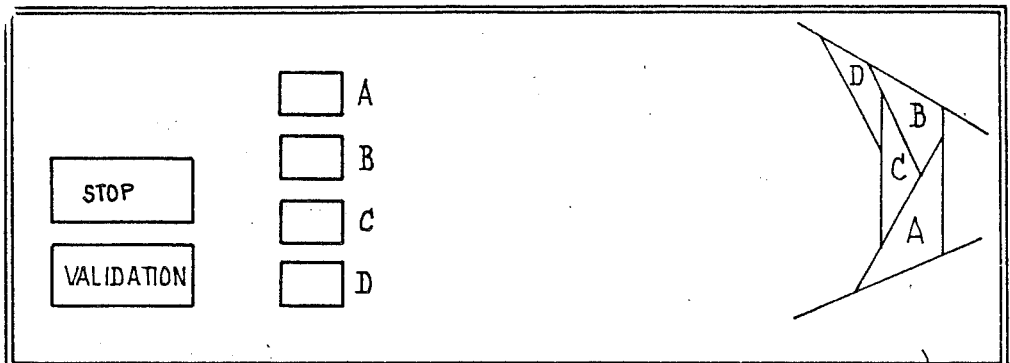
Figure 16:
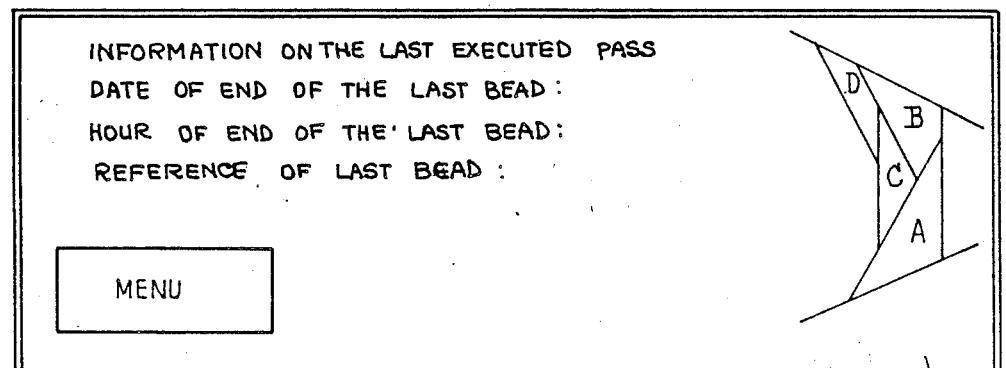
Figure 17:
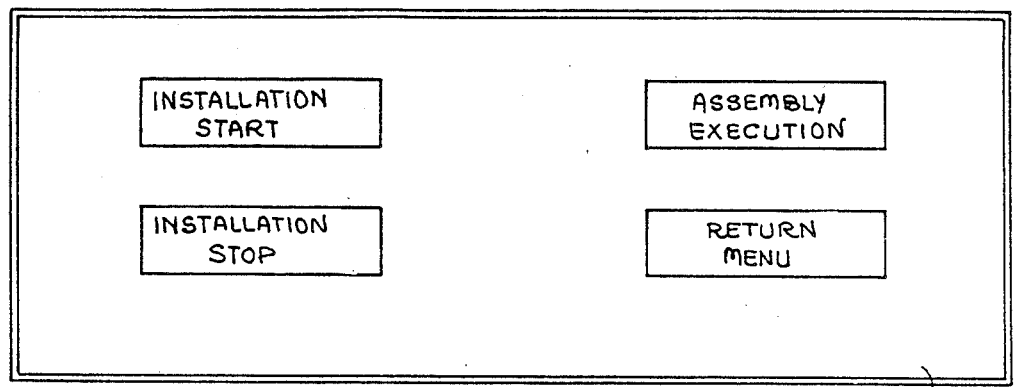
Figure 20:
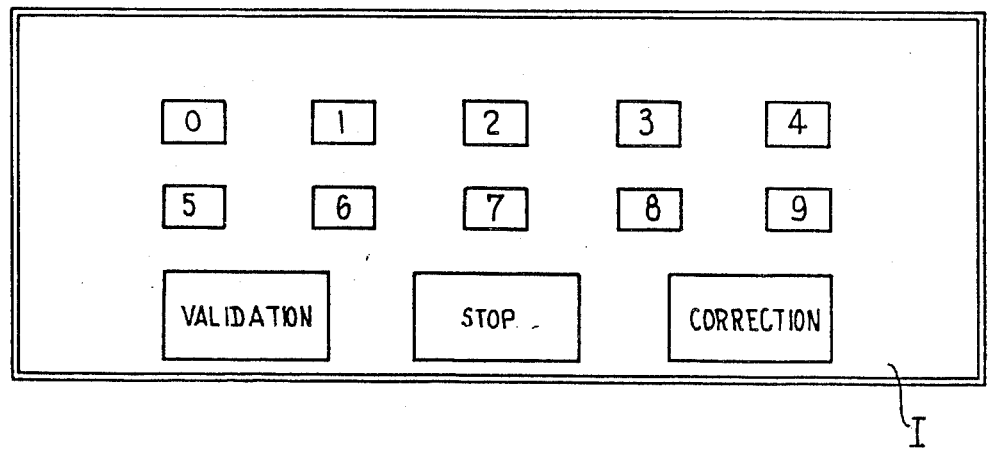

FIGS. 9, 10 and 11 show, respectively, the successive sequences of a dialogue between the operator and the assistance computer 36 for storing the data relating to all the planned procedures, before the apparatus is started up, for the preparation of a welding pass and for the initiation of the welding operation itself.

Each of the steps of the dialogue between the operator and the computer is symbolized by a rectangle representing the touch-screen 41, on which the elements necessary for the dialogue during this step are displayed.

The display on the touch-screen 41 can take one of the nine forms illustrated in FIGS. 12 to 20. The displays have designed by the letters A, B, C, D, E, F, G. H and I. The letters corresponding to each of the phases have been associated with the successive rectangles in FIGS. 9, 10 and 11. Each of the displays makes it possible either to select a procedure or a welding pass or to enter and display data or to obtain by display values of the welding parameters and finally to validate these values. The operator acts simply by touching the screen, the information of which is expressed in a completely explicit form, as can be seen in FIGS. 12 to 21. The operator assistance computer can thus be used without difficulty by personnel not having received any training information technology.

FIG. 9 shows the sequence making it possible to enter in the computer memory the values of the parameters involved in the normal and exceptional procedures implemented in a welding operation.

The sequence is executed before the apparatus is started up, and is based on the data known for similar apparatuses and operations.

After the software has been loaded, a first enquiry regarding the position of the welded joint (vertical, horizontal or inclined) is displayed.

The screen then shows a table of the type A (FIG. 12), making it possible to display the main menu of the software. The user, by touching one of the boxes, can then display the following step: either recording of procedures or the starting of the operation of information on the work in progress.

Where the sequence of FIG. 10 is concerned, the following step is a table of type C, making it possible to choose the definition of the normal or exceptional procedures. In both cases, the procedure is chosen and designated (table G). The type of welding pass is then designated (table D). The various welding parameters then show up in succession and are displayed in a numerical table of type I. The system then returns to a table of type A, making it possible to select the definition of the procedures once again.

The process thus involves successive inputs of all the parameters relating to all the procedures selected.

FIG. 10 illustrates a sequence used for the preparation of welding, before the start of a pass.

The first table of type A makes it possible to obtain information on the last pass executed, by showing the table of type E and returning to the menu (type A); by subsequently displaying the menu (table B), the welding preparation procedure can then be selected. The choice of the normal procedures appearing on the screen (table G) is then made; after a normal procedure has been chosen, table D appears and makes it possible to select a type of welding pass. When this choice has been made, the various welding parameters appear so that they can be entered in the welding programming cabinet. The parameters entered must then be validated by the computer (Table I). For this purpose, the software compares the displayed value with the stored value. If there is identity between the two values, validity is confirmed. If a difference appears, a warning message is sent to the operator. If the value selected by the operator is within the tolerance allowed by the parameter, it is a simple warning without any influence on the validation, whereas if the valve of the parameter is outside the tolerance validation does not take place. The apparatus cannot then be started. The same applies to the parameters which are changed during welding, the assistance computer supplying the operator with the interval within which the parameter can be changed. This change is a result of the monitoring of the screens displaying the welding zone by the operator. The correcting actions of the operator, which relate particularly to the position of the electrode and of the build-up wire, thus always remain within the permitted limits, thereby preventing inopportune actions.

As can be seen in FIG. 11, after the welding preparation sequence, the actual operation can start, unless an emergency stop occurs; the computer then displays the menu for an exceptional procedure.

The welding pass continues to the moment when the operator observes the end of a pass on the display screens.

In shift work which is always used for long operations, such as the welding of steam-generator connections, at the start of of the shift the operator must consult the information on the last pass executed during the previous shift. At the end of the shift, the operator records the data necessary for informing his successor.

The process according to the invention thus makes it possible to carry out complex welding operations in such a way that the welding parameters are always defined reliably and accurately, at the same time presenting any risk of error. On the other hand, the process makes it possible to monitor and control the welding operation continuously and remotely, without the risk of errors which may arise from an incorrect assessment of the appearance of the welding zone.

All these results are obtained at a complexity and cost which are limited because of manual intervention based on visual observation and controlled by automatic means.

The control devices, the data-processing means and the display devices may differ from those described.

Moreover, the welding process according to the invention can be used in sectors other than the welding of pipes for the replacement of a steam generator of a pressurized-water nuclear reactor. The process can be used for the welding of any pipeline requiring remote action and, more generally, the in the welding of any body of revolution in industrial sectors, such as the nuclear industry or chemical or petrochemical industry.

I claim:

1. Process for the remote-controlled semi-automatic welding of two large-size rotationally symmetrical components (6, 10) by filling an annular chamfer (17) with a welding metal in successive shielded-arc orbital welding passes (20), making it possible to form layers of welding metal (18) in the chamfer (17) by placing metal beads (18) next to one another, each bead deposited during a pass being of a specific type, depending on its position in the chamfer (17), said process comprising performing the following steps, from a control station (14) located at a distance from the welding zone and managed by an operator, for each of the passes:

(a) setting the welding parameters, the type of pass and the values to be given to the parameters as a function of the type of pass being supplied to the operator by a storage memory means, in which the information relating to the welding operation is stored;

(b) checking that each of the welding parameters is set at a suitable value according to the type of pass;

(c) starting the welding operation manually and remotely;

(d) monitoring the welding operation continuously by means of a remote screen display (38, 40) of the welding zone;

(e) changing one or more welding parameters according to the image of the welding zone, the limits within which the parameters can be changed being supplied to the operator by the memory means; and (f) stopping the welding operation manually when the image obtained on the screen (39, 40) corresponds to the end of a pass.

2. Welding process according to claim 1, wherein the values of the parameters for a welding pass and the limits within which the parameters can be changed during welding are supplied to the operator by a computer (36) which has a touch-screen (41) making it possible to carry out a dialogue between the operator and the computer (36).

3. Welding process according to claim 2, wherein the values of the parameters are checked by the computer (36), in such a way that a warning signal is displayed on its screen (41) if a parameter selected by the operator has a value different form an envisaged value.

4. Welding process according to claim 3, wherein the computer (36) commands blocking of the starting of the welding operation when a value of a parameter selected by the operator is outside predetermined limits.

5. Welding process according to claim 1, wherein the two components (6, 10) to be welded are respectively a primary pipe of a pressurized-water nuclear reactor and a pipe connection of a steam generator of said nuclear reactor.

* * * * *